(12) United States Patent
Kim et al.

(10) Patent No.: US 10,480,622 B2
(45) Date of Patent: Nov. 19, 2019

(54) TWO-SPEED TRANSMISSION FOR ELECTRIC VEHICLE

(71) Applicant: NEOOTO CO., LTD., Seoul (KR)

(72) Inventors: Sun Hyun Kim, Seoul (KR); Sun Beom Woo, Chungcheongnam-do (KR); Se Hoon Oh, Hwaseong-si (KR); Duk Soon Choi, Chungcheongnam-do (KR)

(73) Assignee: NEOOTO CO., LTD., Seoul (KR)

( * ) Notice: Subject to any disclaimer, the term of this patent is extended or adjusted under 35 U.S.C. 154(b) by 110 days.

(21) Appl. No.: 15/834,483

(22) Filed: Dec. 7, 2017

(65) Prior Publication Data

US 2018/0216709 A1 Aug. 2, 2018

(30) Foreign Application Priority Data

Feb. 1, 2017 (KR) .......................... 10-2017-0014318

(51) Int. Cl.
*F16H 3/44* (2006.01)
*F16H 3/62* (2006.01)
(Continued)

(52) U.S. Cl.
CPC ................. *F16H 3/62* (2013.01); *B60K 1/00* (2013.01); *F16H 3/663* (2013.01); *B60K 2001/001* (2013.01); *F16H 2200/0034* (2013.01); *F16H 2200/2005* (2013.01); *F16H 2200/2035* (2013.01)

(58) Field of Classification Search
CPC ..... F16H 3/44; F16H 3/46; F16H 3/48; F16H 3/56; F16H 2200/0034; F16H 2200/2005; F16H 2200/2035; F16H 2200/2007
See application file for complete search history.

(56) References Cited

U.S. PATENT DOCUMENTS 9,719,584 B1 † 8/2017 Duan
2004/0132578 A1* 7/2004 Richards ................ F16H 3/56
475/283

(Continued)

FOREIGN PATENT DOCUMENTS

JP 2004-251344 A 9/2004
KR 10-2010-0101543 A 9/2010
(Continued)

*Primary Examiner* — Edwin A Young
(74) *Attorney, Agent, or Firm* — Paratus Law Group, PLLC

(57) ABSTRACT

The present invention relates to a two-speed transmission and includes a first sun gear; a second sun gear; a plurality of first planetary gears which are engaged with the first sun gear to rotate or revolve along a circumferential direction of the first sun gear; a ring gear which includes an inner circumferential gear and an outer circumferential gear, the outer gear rotating by being engaged with an input gear which rotates by a driving device; a plurality of second planetary gears which are engaged with the inner circumferential gear and the second sun gear to rotate or revolve along a circumferential direction of the second sun gear; a carrier to which the first planetary gears and the second planetary gears are rotatably connected; and a brake part which selectively fixes the first sun gear and the second sun gear.

9 Claims, 7 Drawing Sheets

(51) Int. Cl.
*B60K 1/00* (2006.01)
*F16H 3/66* (2006.01)

(56) References Cited

U.S. PATENT DOCUMENTS

| | | | | |
|---|---|---|---|---|
| 2015/0024895 A1* | 1/2015 | Ono | ...................... | B60K 6/365 |
| | | | | 475/5 |
| 2015/0167788 A1* | 6/2015 | Beck | ........................ | F16H 3/66 |
| | | | | 475/149 |
| 2016/0138683 A1* | 5/2016 | Kato | ...................... | F16H 3/663 |
| | | | | 475/269 |

FOREIGN PATENT DOCUMENTS

| KR | 10-2012-0055335 A | 5/2012 |
|---|---|---|
| KR | 10-1700676 B1 | 1/2017 |

\* cited by examiner
† cited by third party

TWO-SPEED TRANSMISSION FOR ELECTRIC VEHICLE

CROSS-REFERENCE TO RELATED APPLICATION

This application claims priority to and the benefit of Korean Patent Application No. 10-2017-0014318 filed in the Korean Intellectual Property Office on Feb. 1, 2017, the entire contents of which are incorporated herein by reference.

TECHNICAL FIELD

The present invention relates to a two-speed transmission for an electric vehicle.

BACKGROUND ART

An electric vehicle uses electricity as a power source different from a gasoline vehicle or a diesel vehicle using gasoline or diesel, so it is an environment-friendly vehicle without emitting exhaust gases.

Since a conventional two-speed transmission for an electric vehicle needs a step of forcibly synchronizing speeds between an input shaft and an output shaft with a synchronizer ring or the like during shift from a first shift speed to a second shift speed, shift shock may occur so that a higher speed shift control performance is required in order to solve this problem. Also, since a transmission for an electric vehicle is driven by a motor which is driven by electricity which is the power source of an electric vehicle, it should be lightweight and needs to have a simplified structure.

Prior art document: Korea patent publication No. 10-2012-0055335

DETAILED DESCRIPTION OF THE INVENTION

Technical Problem

The present invention has been made in an effort to provide a two-speed transmission for an electric vehicle which has no shift shock during shift and may realize various shift ratio while having a compact and simple structure.

Technical Solution

A two-speed transmission according to an embodiment of the present invention includes: a first sun gear; a second sun gear; a plurality of first planetary gears which are engaged with the first sun gear to rotate or revolve along a circumferential direction of the first sun gear; a ring gear which includes an inner circumferential gear and an outer circumferential gear, the outer circumferential gear rotating by being engaged with an input gear which rotates by a driving device; a plurality of second planetary gears which are engaged with the inner circumferential gear and the second sun gear to rotate or revolve along a circumferential direction of the second sun gear; a carrier to which the first planetary gears and the second planetary gears are rotatably connected; and a brake part which selectively fixes the first sun gear and the second sun gear.

The first sun gear and the second sun gear may respectively include a first and a second elongation portion with a cylindrical shape, a diameter of the first elongation portion may be greater than a diameter of the second elongation portion, and the second elongation portion may be provided to be rotatable within the first elongation portion.

The brake part may include a first brake friction plate and a second brake friction plate which are respectively connected to the first elongation portion and the second elongation portion, and a first brake and a second brake which respectively fix the first brake friction plate and the second brake friction plate.

A shift to a first shift speed may be performed by that the first brake operates so as to fix the first sun gear and the second brake is released so as to allow the second sun gear to idle.

A shift to a second shift speed may be performed by that the first brake is released so as to allow the first sun gear to idle and the second brake operates to fix the second sun gear.

Each one of the first planetary gear and each one of the second planetary gear may be connected to one another and rotate about a rotating axis provided by the carrier.

The first planetary gear may be not engaged with the inner circumferential gear but may rotate in the same way with the second planetary gear in response to a rotation of the second planetary gear.

The carrier may include an output gear and the output gear is engaged with a driving gear.

The carrier may rotate together in response to a revolution of the first planetary gear or the second planetary gear so as to output a force.

Advantageous Effects

In a two-speed transmission according to an embodiment of the present invention, if a change of a gear ratio is necessary, various gear ratios can be realized only by changing teeth numbers of the planetary gear and the sun gear inside the ring gear, so the products of various performances can be produced.

In addition, since it is not necessary to forcibly synchronize the gear ratios between the input shaft and the output shaft during the shift from a first shift speed to a second shift speed or vice versa, a shift shock does not occur, and the shift control can be simply performed since only the control of making the rotation speed of the idling first or second sun gear zero is required.

In addition, since the two-speed transmission can be formed using two planetary gears, two brakes, two sun gears and one ring gear, it has a compact and simple structure, and accordingly by applying this to an electric vehicle the output of the motor and the efficiency of the battery can be enhanced.

DETAILED DESCRIPTION OF THE EMBODIMENTS

The present invention will be described by embodiments of the present invention with reference to drawings for explaining a two-speed transmission 200 for an electric vehicle.

Figure 1:
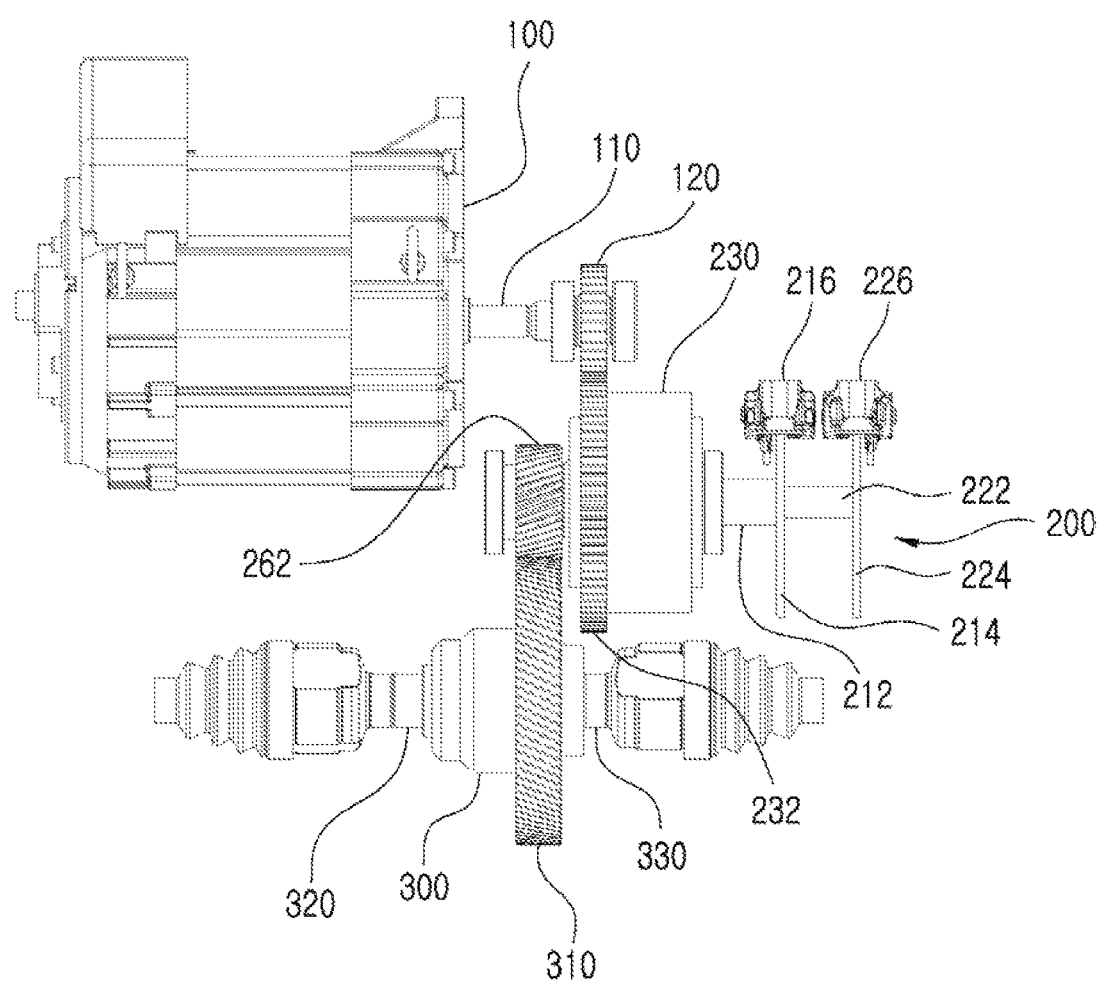
FIG. 1 is a top plan view of an electric vehicle to which a two-speed transmission according to an embodiment of the present invention has been applied.
Figure 2:
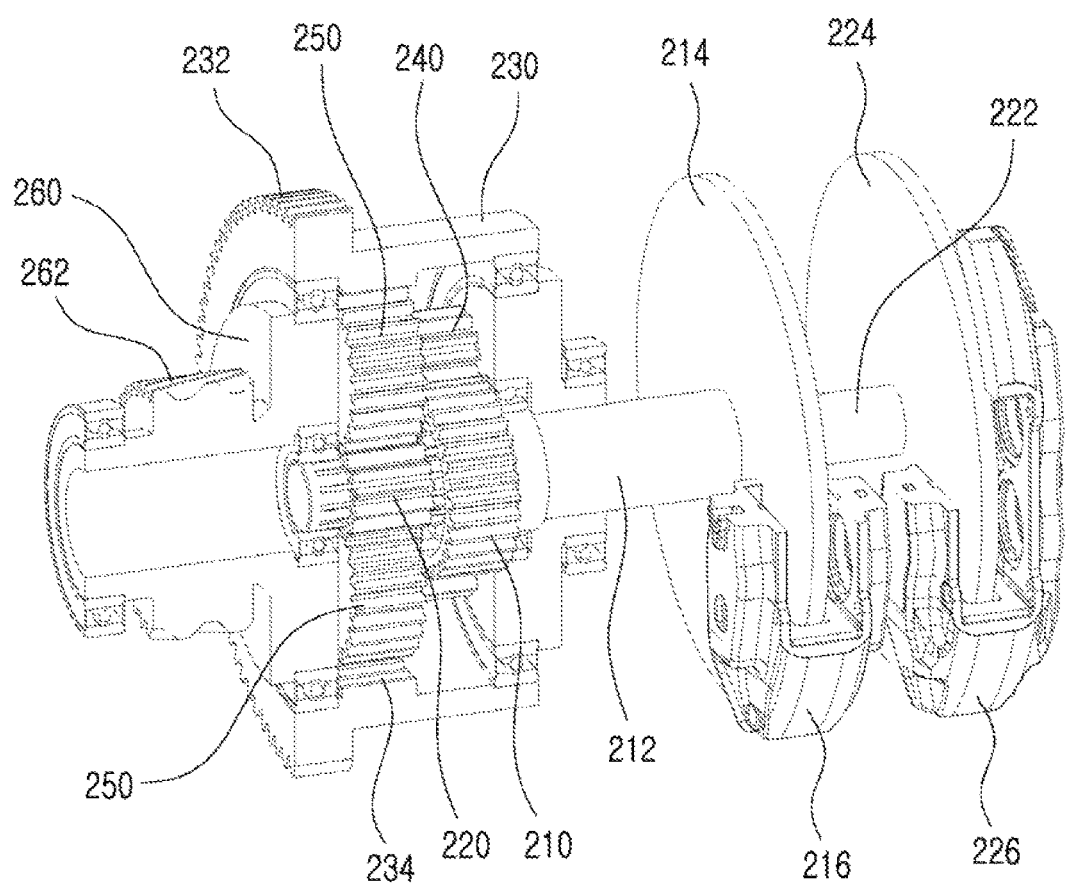
FIG. 2 is a sectional view of a two-speed transmission for an electric vehicle according to an embodiment of the present invention.
Figure 3:
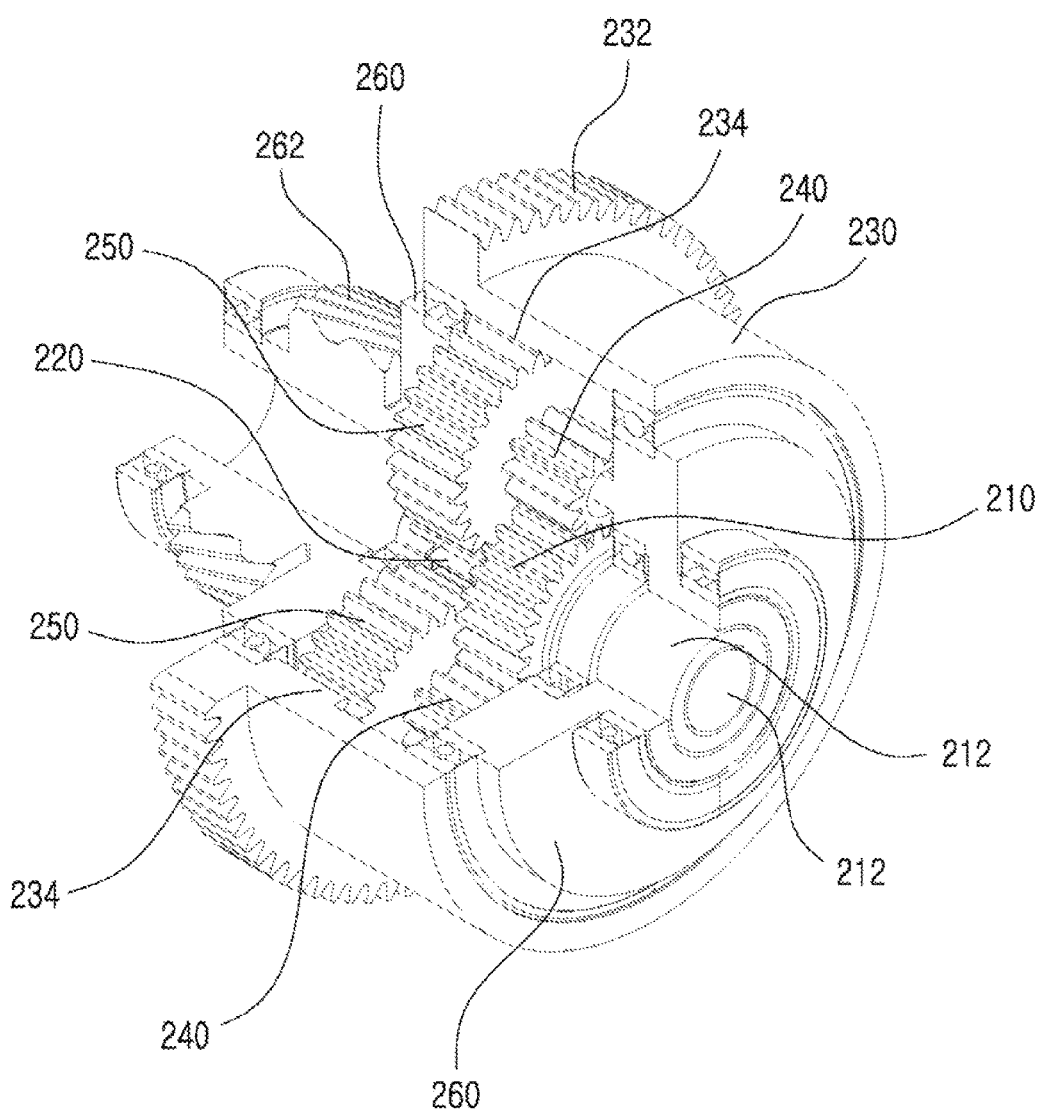
FIG. 3 is a partial sectional view of a two-speed transmission of an electric vehicle according to an embodiment of the present invention.

FIG. 1 is a top plan view of an electric vehicle to which a two-speed transmission according to an embodiment of the present invention has been applied, and FIG. 2 is a sectional view of a two-speed transmission for an electric vehicle according to an embodiment of the present invention. FIG. 3 is a partial sectional view of a two-speed transmission of an electric vehicle according to an embodiment of the present invention.

Referring to FIG. 1 to FIG. 3, the two-speed transmission 200 for an electric vehicle according to an embodiment of the present invention includes a first sun gear 210, a second sun gear 220, a ring gear 230, a plurality of first planetary gears 240, a plurality of second planetary gears 250, a carrier 260 and a brake part.

The ring gear 230 is formed in a ring shaft, and is provided with an outer circumferential gear 232 at an outer circumference thereof and is provided with an inner circumferential gear 234 at an inner circumference thereof. The outer circumferential gear 232 is engaged with an input gear 120 which is connected to an input shaft 110 which rotates by the power of a motor 100 which is electrically driven, and the ring gear 230 rotates with a gear ratio between the input gear 120 and the outer circumferential gear 232 in response to the rotation of the input gear 120. The first and second sun gears 210 and 220 and the first and second planetary gears 240 and 250 are disposed within the ring gear 230.

The first sun gear 210 includes a first elongation portion 212 of a cylindrical shape, has an opening hole which is formed therein along an axial direction of a cylinder, and may idle or may be fixed in response to the rotation of the first planetary gear 240. The elongation portion 212 of the first sun gear 210 is formed by being extended to be protruded from the carrier 260.

The second sun gear 220 includes a second elongation portion 222 of a cylindrical shape, is inserted into the first sun gear 210 and the first elongation portion 212 to be located in the same rotational axis with the first sun gear 210, and is disposed so as to be able to idle in response to the rotation of the second planetary gear 250. The second sun gear 220 is formed to have a less diameter than the first sun gear 210, and the diameter of the second elongation portion 222 is less than that of the first elongation portion 212. The second elongation portion 222 of the second sun gear 220 is formed to be protruded from the first elongation portion 212 of the first sun gear 210.

The brake part includes a first brake friction plate 214 which is connected to the first elongation portion 212, a first brake 216 which fixes or rotates the first brake friction plate 214, a second brake friction plate 224 which is connected to the second elongation portion 222, and a second brake 226 which fixes or rotates the second brake friction plate 224.

The first and second brakes 216 and 226 are operated or released by an electric motor (not shown), a hydraulic actuator (not shown) or the like, and fixe or rotate the first and second brake friction plates 214 and 224 respectively, so as to selectively fixe or rotate the first and second sun gears 210 and 220 which are respectively connected thereto.

The plurality of first planetary gears 240 are engaged with the first sun gear 210, and rotate or revolve along a circumferential direction of the first sun gear 210. The plurality of second planetary gears 250 are engaged with the second sun gear 220 and the inner circumferential gear 234, and rotate or revolve along a circumferential direction of the second sun gear 220.

The first and second planetary gears 240 and 250 are formed by at least three planetary gears, and are formed in the same number. Each one of the first planetary gear 240 and each one of the second planetary gear 250 are coupled with one another, so if the second planetary gear 250 rotates by the rotation of the inner circumferential gear 234, the first planetary gear 240 which is not engaged with the inner circumferential gear 234 rotates in the same way with the second planetary gear 250.

The carrier 260 includes an output gear 262, and provides rotation axes for the rotation of the first and second planetary gears 240 and 250. Also, the carrier 260 rotates together when the first planetary gear 240 revolves along the first sun gear 210 or the second planetary gear 250 revolves along the second sun gear 220, and transfers driving force via the output gear 262 to a driving gear 310 which is engaged with the outer gear 262.

The driving force of the motor 100 is transmitted to the driving gear 310 by the rotation of the driving gear 310 and is then transmitted to tires (not shown) via drive shafts 320 and 330 which are disposed on both sides of a differential gear 300.

Not described above, the respective parts of the two-speed transmission 200 can be supported or rotated by a plurality of bearings.

Shift operations of the two-speed transmission 200 according to an embodiment of the present invention will be described referring to FIG. 4 to FIG. 7.

Figure 4:
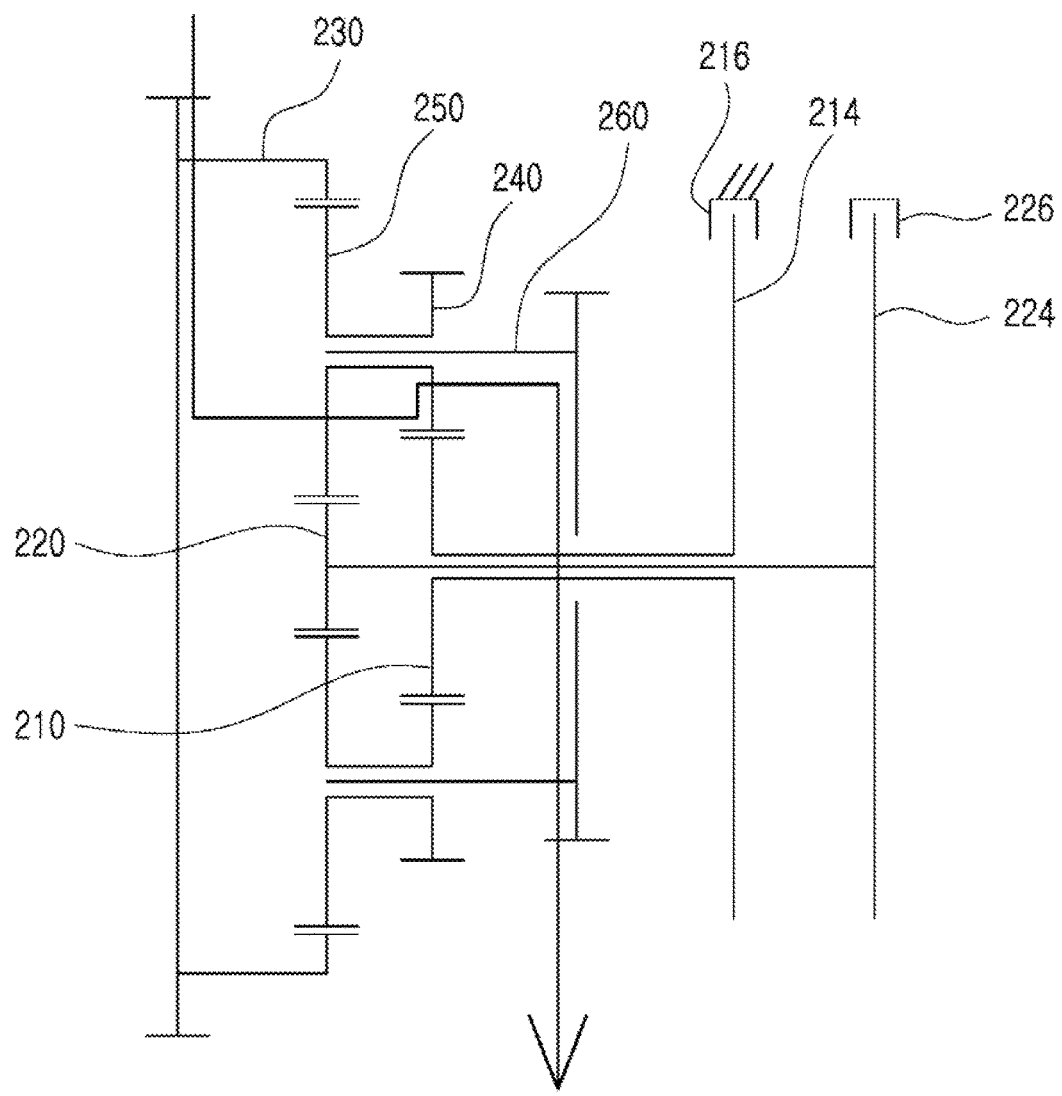
FIG. 4 is a diagram of power transmission of a first shift speed of a two-speed transmission according to an embodiment of the present invention.
Figure 5:
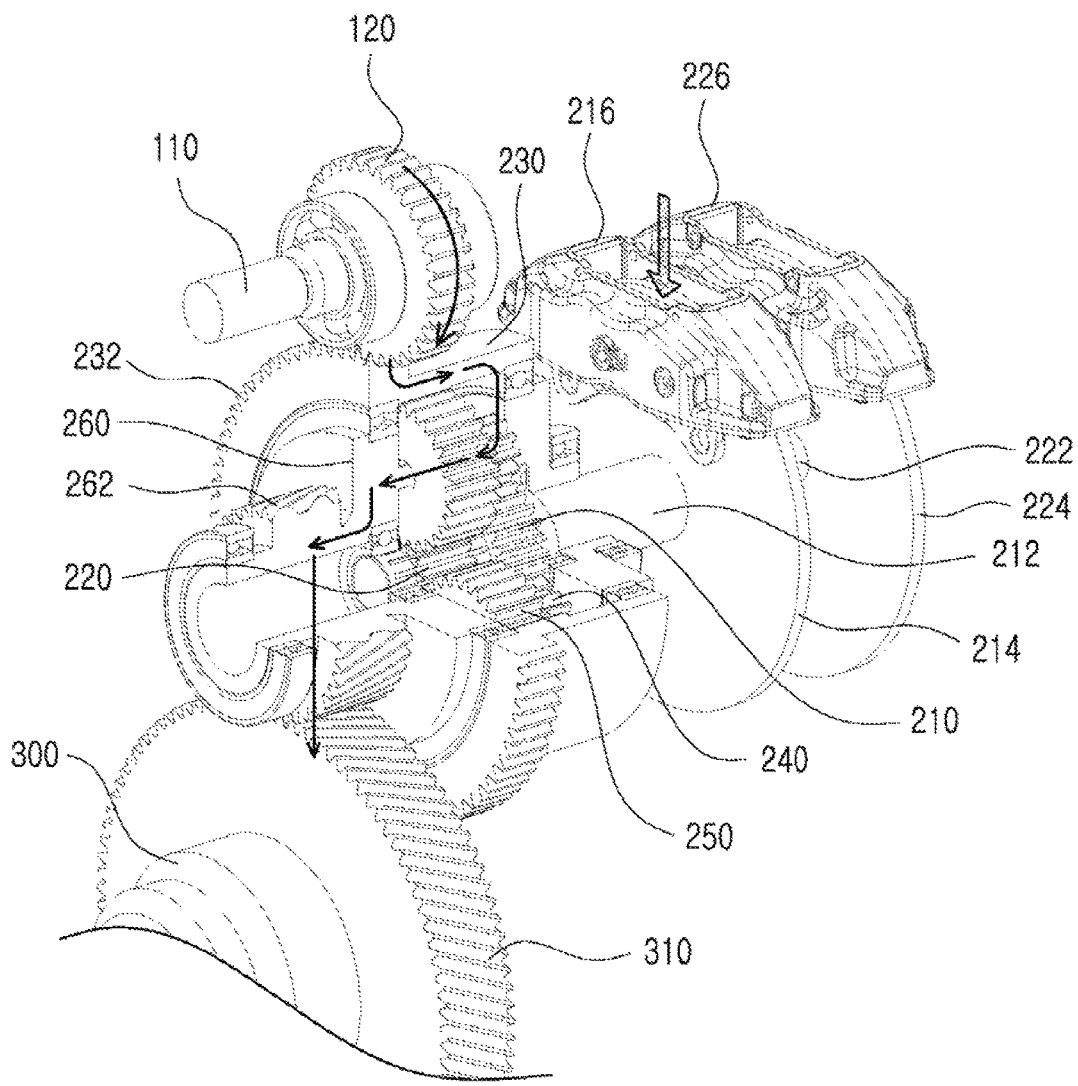
FIG. 5 is a schematic drawing of a two-speed transmission shown in FIG. 4.
Figure 6:
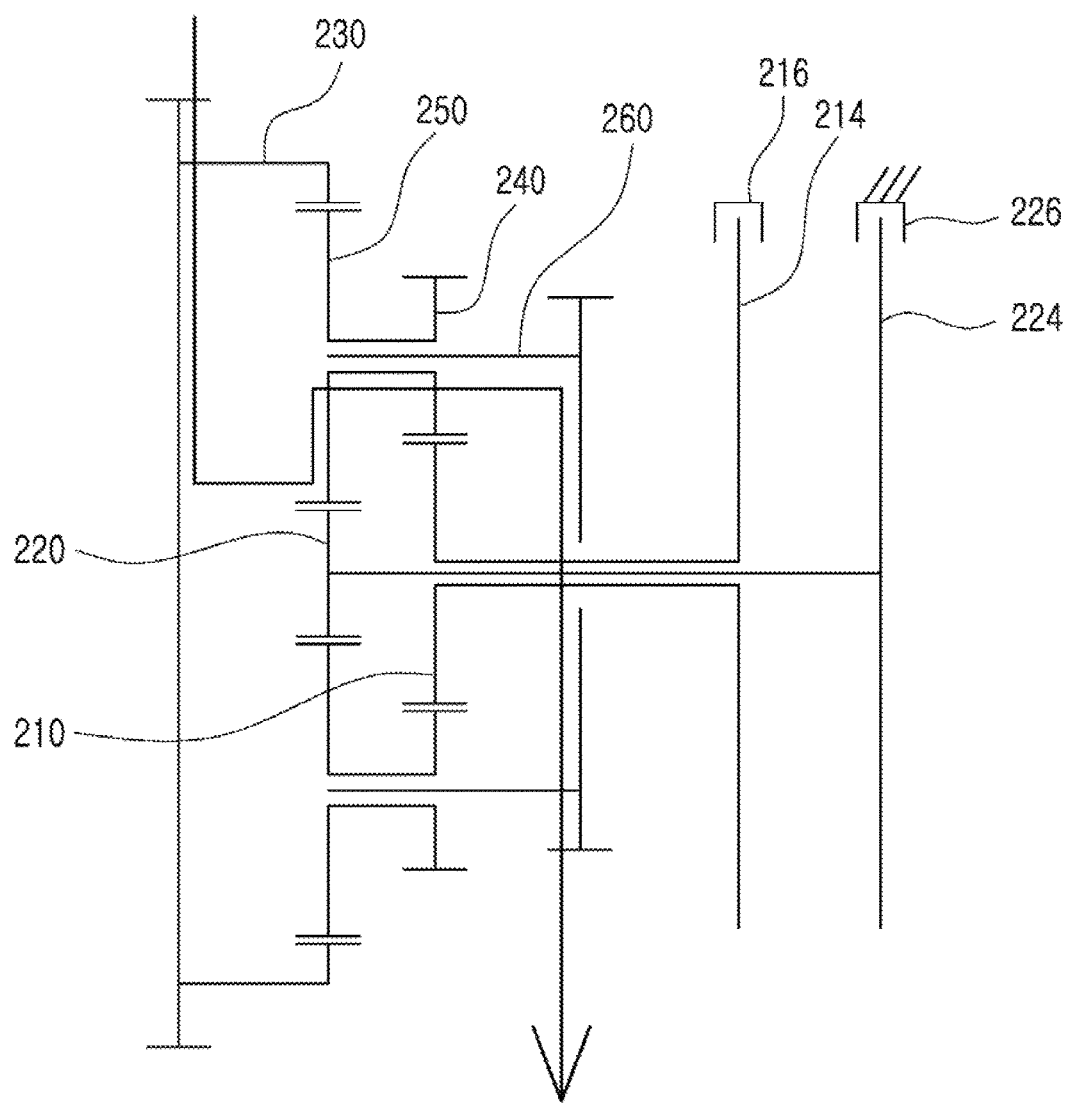
FIG. 6 is a diagram of power transmission of a second shift speed of a two-speed transmission according to an embodiment of the present invention.
Figure 7:
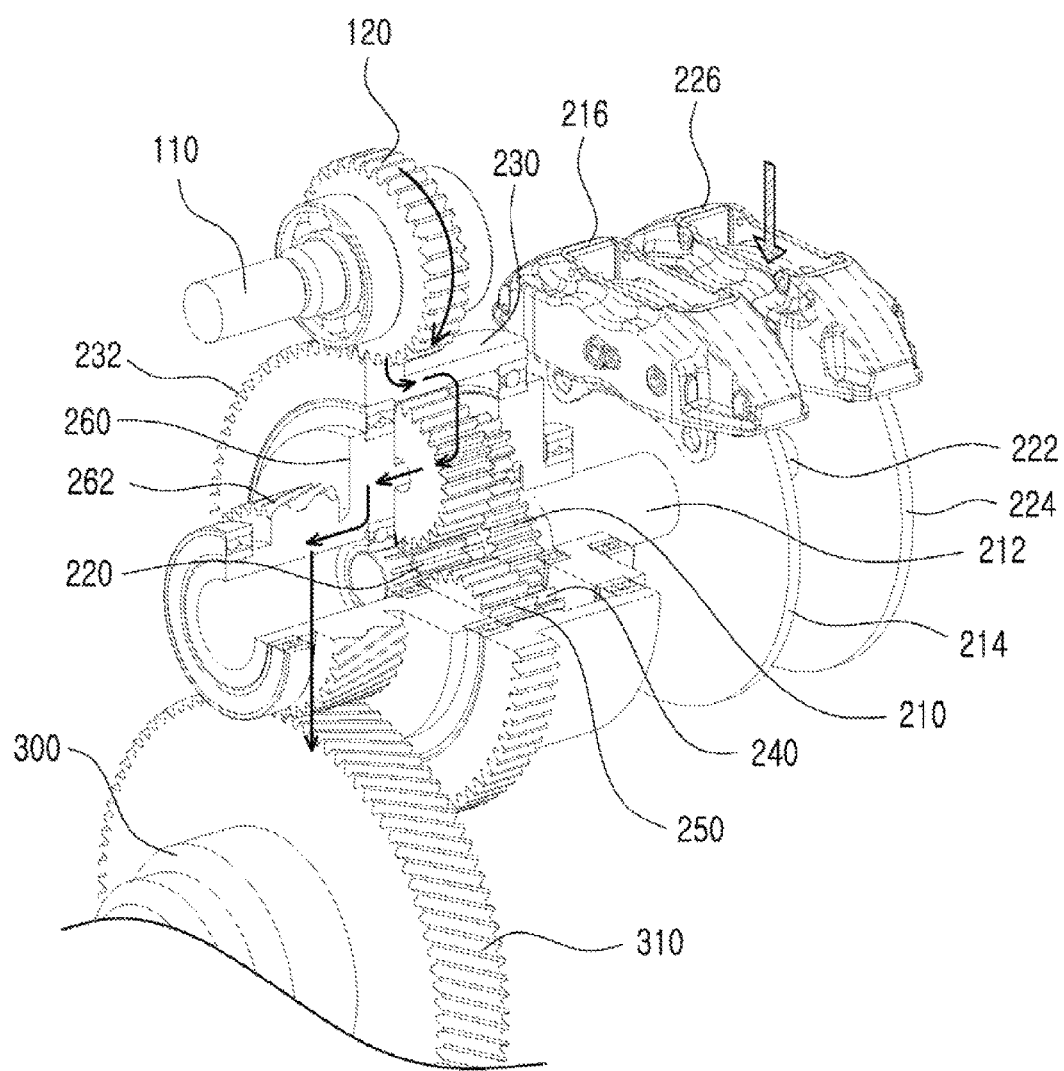
FIG. 7 is a schematic drawing of a two-speed transmission shown in FIG. 6.

FIG. 4 is a diagram of power transmission of a first shift speed of a two-speed transmission according to an embodiment of the present invention, FIG. 5 is a schematic drawing of a two-speed transmission shown in FIG. 4, FIG. 6 is a diagram of power transmission of a second shift speed of a two-speed transmission according to an embodiment of the present invention, and FIG. 7 is a schematic drawing of a two-speed transmission shown in FIG. 6.

First, as a neutral gear state, this is the case that the first and second brakes 216 and 226 do not fix the first and second brake friction plates 214 and 224 so that the first and second brake friction plates 214 and 224 can freely idle. If the first and second brake friction plates 214 and 224 can freely idle, the first and second sun gears 210 and 220 can also freely idle.

Even in case that the circumferential gear 232 rotates in response to the rotation of the motor 100 and the second planetary gear 250 rotates by the inner circumferential gear 234, the second planetary gear 250 only rotates about the rotation axis of the carrier 260 without revolving along the circumferential direction of the second sun gear 220. That is, since the carrier 260 receives great force by grip force of a tire, the second sun gear 220 idles in response to the rotation of the second planetary gear 250.

Further, in response to the rotation of the second planetary gear 250, the first planetary gear 240 only rotates without revolving along the circumferential direction of the first sun gear 210 on the same reason described above, and the first sun gear 210 idles in response to the rotation of the first planetary gear 240.

Next, as shown in FIG. 4 and FIG. 5, the shift to a first shift speed of a two-speed transmission 200 according to an embodiment of the present invention will be described. At the first shift speed, the first brake 216 is operated to fix the first brake friction plate 214 and the second brake 226 is released so that the second brake friction plate 224 can idle.

Thus, the circumferential gear 232 rotates in response to the rotation of the input gear 120, and according the second planetary gear 250 rotates. Further, since the second sun gear 220 can idle, the second sun gear 220 idles even when the second planetary gear 250 rotates.

Meanwhile, since the first planetary gear 240 rotates in response to the rotation of the second planetary gear 250 and the first sun gear 210 is fixed, the first planetary gear 240 revolves along the circumferential direction of the first sun gear 210 and thus the carrier 260 also rotates in response to the revolution of the first planetary gear 240, so the shift to the first shift speed is completed. The gear ratio of the first shift speed is determined depending on the numbers of the teeth of the first planetary gear 240 and the first sun gear 210.

Next, as shown in FIG. 6 and FIG. 7, the shift to a second shift speed of a two-speed transmission 200 according to an embodiment of the present invention will be described. At the second shift speed, the second brake 226 is operated to fix the second brake friction plate 224 and the first brake 216 is released so that the first brake friction plate 214 can idle.

Then, the outer circumferential gear 232 rotates in response to the rotation of the input gear 120, and accordingly the second planetary gear 250 rotates. Further, since the second sun gear 220 is fixed, the second planetary gear 250 revolves along the circumferential direction of the second sun gear 220 and thus the carrier 260 also rotates in response to the revolution of the second planetary gear 250, so the shift to the second shift speed is completed. The gear ratio of the second shift speed is determined depending on the numbers of the teeth of the second planetary gear 250 and the second sun gear 220.

Meanwhile, since the first planetary gear 240 rotates in response to the rotation of the second planetary gear 250 and the first sun gear 210 is able to idle, the first sun gear 210 idle even when the first planetary gear 240 rotates.

When a shift from the first shift speed to the second shift speed is performed, the first brake 216 is immediately released, the second brake 226 may be controlled such that the idling second sun gear 220 becomes fixed, i.e., the rotation speed of the second sun gear 220 becomes zero.

On the contrary, when a shift from the second shift speed to the first shift speed, the second brake 226 is immediately released, and first brake 216 may be controlled such that the idling first sun gear 210 becomes fixed, i.e., that the rotation speed of the first sun gear 210 becomes zero.

As such, since a process of forcibly synchronizing the speeds using a synchronizer or the like in order to eliminate the speed difference between the input shaft and the output shaft during the shift from the second shift speed to the first shift speed, there is no possibility of the occurrence of shift shock, and the shift control can be simply performed since only the control of making the rotation speed of the idling first or second sun gear 210 or 220 zero is required.

In addition, the two-speed transmission 200 according to an embodiment of the present invention can accomplish various shift ratios by regulating the numbers of teeth of the first planetary gear 240 and the first sun gear 210 and the numbers of teeth of the second planetary gear 250 and the second sun gear 220.

In addition, since the two-speed transmission 200 according to an embodiment of the present invention can be formed using two planetary gears, two brakes, two sun gears and one ring gear, it has a compact and simple structure, and accordingly by applying this to an electric vehicle the output of the motor and the efficiency of the battery can be enhanced.

In addition, although it has been described that the two-speed transmission according to an embodiment of the present invention is applied to an electric vehicle which is driven by the motor 100, it can also be applied to vehicle which is driven by an internal combustion engine.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A two-speed transmission comprising:
   a first sun gear;
   a second sun gear;
   a plurality of first planetary gears which are engaged with the first sun gear to rotate or revolve along a circumferential direction of the first sun gear;
   a ring gear which includes an inner circumferential gear and an outer circumferential gear, the outer circumferential gear rotating by being engaged with an input gear which rotates by a driving device;
   a plurality of second planetary gears which are engaged with the inner circumferential gear and the second sun gear to rotate or revolve along a circumferential direction of the second sun gear;
   a carrier to which the first planetary gears and the second planetary gears are rotatably connected; and
   a brake part which selectively fixes the first sun gear and the second sun gear.

2. The two-speed transmission of claim 1, wherein the first sun gear and the second sun gear respectively comprise a first and a second elongation portion with a cylindrical shape, a diameter of the first elongation portion is greater than a diameter of the second elongation portion, and the second elongation portion is provided to be rotatable within the first elongation portion.

3. The two-speed transmission of claim 2, wherein the brake part comprises a first brake friction plate and a second brake friction plate which are respectively connected to the first elongation portion and the second elongation portion, and a first brake and a second brake which respectively fix the first brake friction plate and the second brake friction plate.

4. The two-speed transmission of claim 3, wherein a shift to a first shift speed is performed when the first brake operates so as to fix the first sun gear and the second brake is released so as to allow the second sun gear to idle.

5. The two-speed transmission of claim 3, wherein a shift to a second shift speed is performed when the first brake is released so as to allow the first sun gear to idle and the second brake operates to fix the second sun gear.

6. The two-speed transmission of claim 1, wherein each one of the first planetary pears and each one of the second planetary pears are connected to one another and rotate about a rotating axis provided by the carrier.

7. The two-speed transmission of claim 1, wherein the first planetary gears are not engaged with the inner circumferential gear but rotate in the same way with the second planetary gears in response to a rotation of the second planetary gears.

8. The two-speed transmission of claim 1, wherein the carrier comprises an output gear and the output gear is engaged with a driving gear.

9. The two-speed transmission of claim 1, wherein the carrier rotates together in response to a revolution of the first planetary gears or the second planetary gears so as to output a force.

\* \* \* \* \*